United States Patent [19]

Giroux

[11] Patent Number: 4,544,167
[45] Date of Patent: Oct. 1, 1985

[54] FACE SEAL WITH RESILIENT PACKING RING FORCING FACE RINGS TOGETHER

[75] Inventor: Claude Giroux, Azle, Tex.

[73] Assignee: Texas Turbine, Inc., Azle, Tex.

[21] Appl. No.: 639,719

[22] Filed: Aug. 13, 1984

Related U.S. Application Data

[62] Division of Ser. No. 387,504, Jun. 11, 1982, Pat. No. 4,477,223.

[51] Int. Cl.[4] .............................................. F16J 15/34
[52] U.S. Cl. ...................................... 277/82; 277/83; 277/85; 277/167.5; 277/177
[58] Field of Search ...................... 277/82, 83, 85, 92, 277/84, 93 SD, 94, 95, 165, 167.5, 173, 177

[56] References Cited

U.S. PATENT DOCUMENTS

| | | | |
|---|---|---|---|
| Re. 23,189 | 1/1950 | Porges | 277/92 X |
| 2,233,624 | 3/1941 | Magnesen | 277/92 X |
| 3,038,318 | 6/1962 | Hanny | 415/111 X |
| 4,342,538 | 8/1982 | Wolford et al. | 277/82 X |
| 4,359,111 | 11/1982 | Gonzalez | 277/85 X |

FOREIGN PATENT DOCUMENTS

| | | | |
|---|---|---|---|
| 53836 | 11/1910 | Switzerland | 277/177 |
| 320297 | 10/1929 | United Kingdom | 277/83 |

Primary Examiner—Robert S. Ward
Attorney, Agent, or Firm—James E. Bradley

[57] ABSTRACT

A turboexpander compressor for use in a gas processing system has a seal system that avoids communication of gas with the oil being pumped through the bearings. The device has a shaft carried in a housing on bearings with a compressor wheel on one side and an expander wheel on the other side. Labyrinth seals seal the wheels from the interior of the housing and the bearings. Mechanical seals are located between the bearings and the labyrinth seals for preventing leakage of oil. The mechanical seals are located in a drainage chamber that allows any oil or gas leaked past the seals to be drained from the system, rather than dilute the oil. Gas is injected from the compressor discharge into a groove on the expander side of the shaft to provide a thermal barrier. The mechanical seals each have a rotating ring carried by the shaft and a nonrotating ring carried by the housing. The nonrotating ring is biased into the rotating ring by means of an O-ring. The O-ring is located in a groove in the bore and a recess formed in the nonrotating ring. The recess is offset to deform the ring and cause it to exert a force on the nonrotating ring against the rotating ring.

9 Claims, 4 Drawing Figures

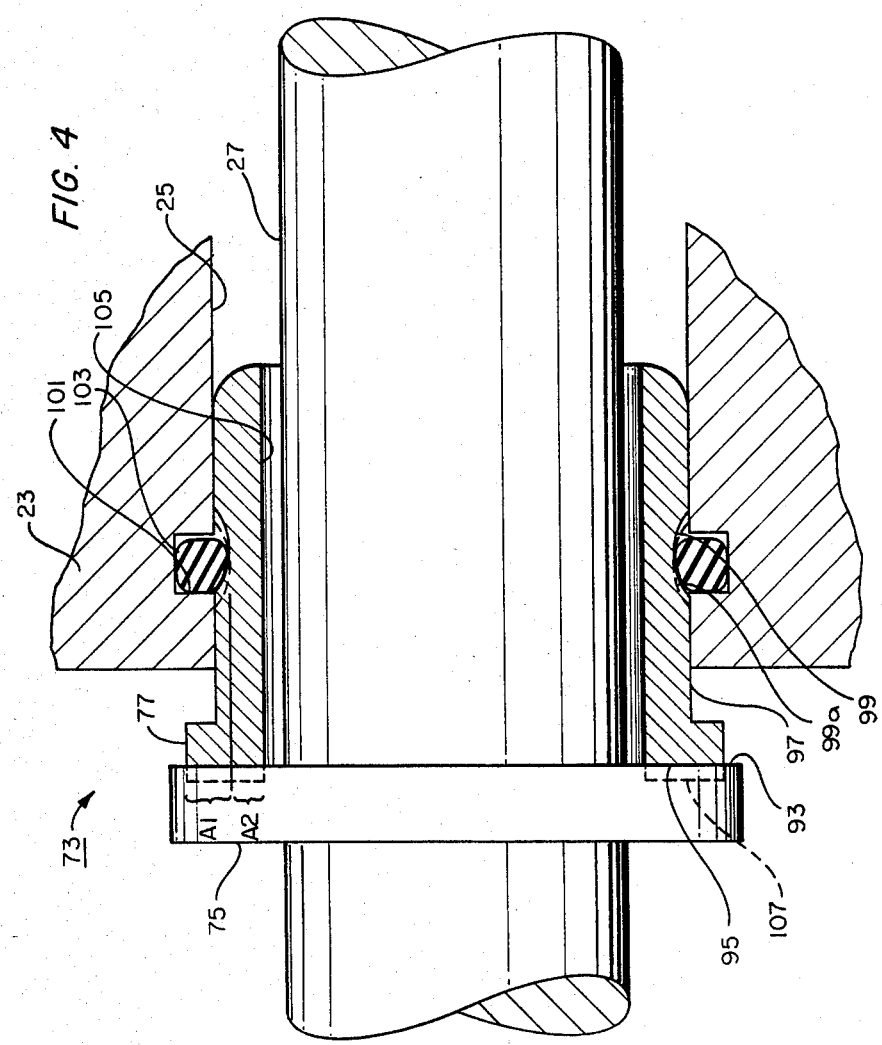

FACE SEAL WITH RESILIENT PACKING RING FORCING FACE RINGS TOGETHER

This application is a division of application Ser. No. 387,504, filed 6/11/82 and now U.S. Pat. No. 4,477,223.

BACKGROUND OF THE INVENTION

This invention relates in general to equipment for processing natural gas to remove heavy hydrocarbons, and in particular to a turboexpander compressor.

A turboexpander compressor is an apparatus used in a natural gas processing plant for lowering the temperature and pressure of incoming rich or process gas. The turboexpander compressor has a shaft mounted in a housing on bearings. An expander turbine wheel is located in an expander chamber on one end of the housing and a compressor wheel is located in a compressor on the other end of the housing. High pressure process gas spins the expander wheel, thereby lowering the pressure and the temperature of the gas. The low temperature gas then proceeds to separators where the heavy hydrocarbon components are separated out. The turboexpander compressor is used in two different types of systems. In the post booster system, the warm, dry gas after separation proceeds to the compressor, which compresses the gas up to a sales line pressure or an intermediate pressure. The compressor is driven by the expander. In the prebooster type of system, the process gas from the incoming line is compressed to the gas proceeding to the expander.

The shaft spins typically at 25,000 to 60,000 rpm (rotations per minute). The gas pressure at the expander inlet typically is 600 to 800 psi (pounds per square inch). The temperature leaving the expander is typically minus 140° F. (degrees Fahrenheit). Consequently, the seal system must seal a shaft at relatively high pressures at high rotational speeds and at low temperatures.

The shaft is supported normally on fluid film type bearings. An oil pump circulates a high flow rate of oil through the bearings. Labyrinth seals are located at the ends of the housings, sealing the shaft ends from the expander and compressor chambers. These labyrinth seals comprise annular grooves closely spaced to the housing bore but not in contact.

While labyrinth seals are durable and do not expend energy, they have a relatively high rate of leakage. If the process gas is allowed to leak through the labyrinth seals and mix with the lubricating oil, the oil will be diluted because of the heavy hydrocarbons present in the process gas. This lowers the viscosity of the oil and reduces its effectiveness. Also, cold gas from the expander leaking into the bearings will freeze the oil and thus damage the system.

Many systems employ seal gas to prevent leakage of process gas from the expander and compressor chambers into the bearing areas. One such system is shown in U.S. Pat. No. 3,420,434 issued Jan. 7, 1969 to J. S. Swearingen. Seal gas systems in general have means for injecting a warm, dry, filtered and lean gas around the shaft between the labyrinth seals and the bearings. This gas is at a pressure sufficient to avoid process gas from leaking past the seal gas into the bearings. The warm seal gas also serves as a thermal barrier to prevent the cold temperatures from freezing the oil.

Although the above-mentioned patent purports to employ seal gas from the compressor discharge, in general, seal gas must come from an exterior supply. One reason is that in the prebooster system, the gas which is being discharged from the compressor would still be rich in hydrocarbons and would dilute the lubricating oil. In a post booster system, the gas at the compressor discharge is warm and lean. However, often there is insufficient pressure developed across the compressor to provide a seal gas pressure sufficient to prevent leakage of oil into the compressor chamber. The oil is pumped at a high velocity, the velocity creating a pressure head that is too high for the seal gas to completely stop. Leakage of oil into the compressor and expander chambers can result in damage to the compressor and expander wheels. Also, if the system is shut down, oil will leak into the compressor and expander chambers because there will be no seal gas pressure.

SUMMARY OF THE INVENTION

In this invention, a turboexpander compressor is provided that uses process gas as a thermal barrier or buffer gas in post booster and prebooster systems. Provisions are provided to prevent dilution or leakage of the buffer gas into the bearing areas, even at shutdown. Labyrinth seals are located at the ends of the housing to seal the expander and compressor chambers from the housing. In addition, mechanical seals are located between the shaft and the labyrinth seals.

Each mechanical seal has a stationary ring mounted to the housing and a rotating ring mounted to the shaft for rotation therewith. The rings have circular faces that are biased together. In operation, an oil film separates the faces, providing good sealing with a low leakage rate. The faces are located in a drainage chamber that also receives any leakage from the labyrinth seals. A passage from the drainage chamber leads to a collection chamber exterior of the housing for receiving oil from the drainage chamber along with gas. The gas can be separated from the oil in the collection chamber, and both may be reused.

To prevent the cold temperatures on the expander side from reaching the mechanical seal and the drainage chamber, buffer gas is injected. The buffer gas is injected into an annular area at the labyrinth seals and vented to a lower pressure residue line. The injected gas comes from the compressor discharge. Leakage from the buffer gas inward through the labyrinth seal proceeds into the drainage chamber, and vents to the collection chamber. The mechanical seal prevents any of the buffer gas from entering the bearing areas, thus the buffer gas may be either rich or lean.

The preferred mechanical seal does not use a conventional coil or wavy spring to urge the opposed faces into contact with either other. Rather, an O-ring is located around the nonrotating seal in grooves that combine to form a cavity. The grooves are offset so as to cause the O-ring to deform and push the nonrotating seal outwardly into contact with the rotating seal.

BRIEF DESCRIPTION OF THE DRAWINGS

FIG. 4 is a sectional view of a mechanical seal employed in the turboexpander compressor of FIG. 3.

DESCRIPTION OF THE PREFERRED EMBODIMENT

Figure 1:
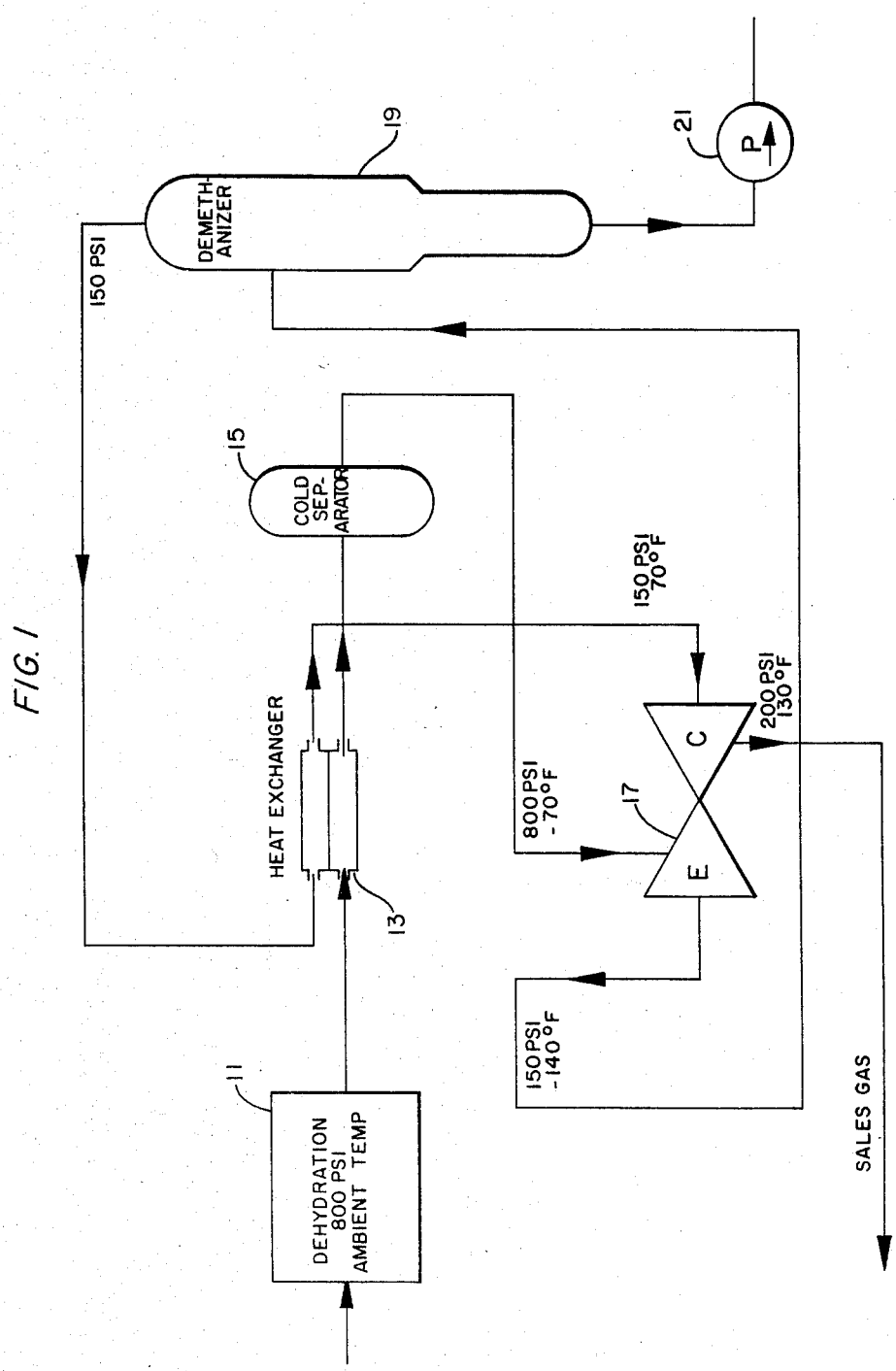
FIG. 1 is a schematic diagram illustrating a turboexpander compressor connected into a post booster gas processing system.

Referring to FIG. 1, in a post booster system, incoming gas proceeds into a dehydration apparatus 11 at ambient temperature and a typical pressure of about 800 psi. In the dehydration apparatus, water is removed from the gas stream by conventional separator techniques. The gas proceeds to a heat exchange 13 where it flows next to tubes containing cold gas, transferring heat from the incoming gas. Gas then enters a cold separator apparatus 15 where certain liquid components are removed by conventional techniques and used for refrigeration purposes in a demethanizer 19.

The gas proceeds to the expander intake of the turboexpander compressor 17 at a pressure typically about 800 psi and a temperature now of $-70°$ F. The gas spins the expander turbine or wheel, and drops to a considerably lower pressure of about 150 psi and a considerably colder temperature of about $-140°$ F. This very cold gas then proceeds to the demethanizer 19 where heavy hydrocarbon components are separated by conventional techniques. A product pump 21 pumps the separated product into pipe lines or storage.

From the demethanizer 19, the gas, now lean, still at 150 psi and at a cold temperature proceeds to the heat exchanger 13 where it absorbs warmth from the incoming gas from the dehydration apparatus 11. The gas then proceeds to the intake of the compressor of the turboexpander compressor 17 at about 150 psi and 70° F. The compressor is driven by the turbine wheel of the expander and compresses this gas to a pressure typically of 200 psi and a temperature of about 130° F. This warm, dry gas proceeds to the sales line.

Figure 2:
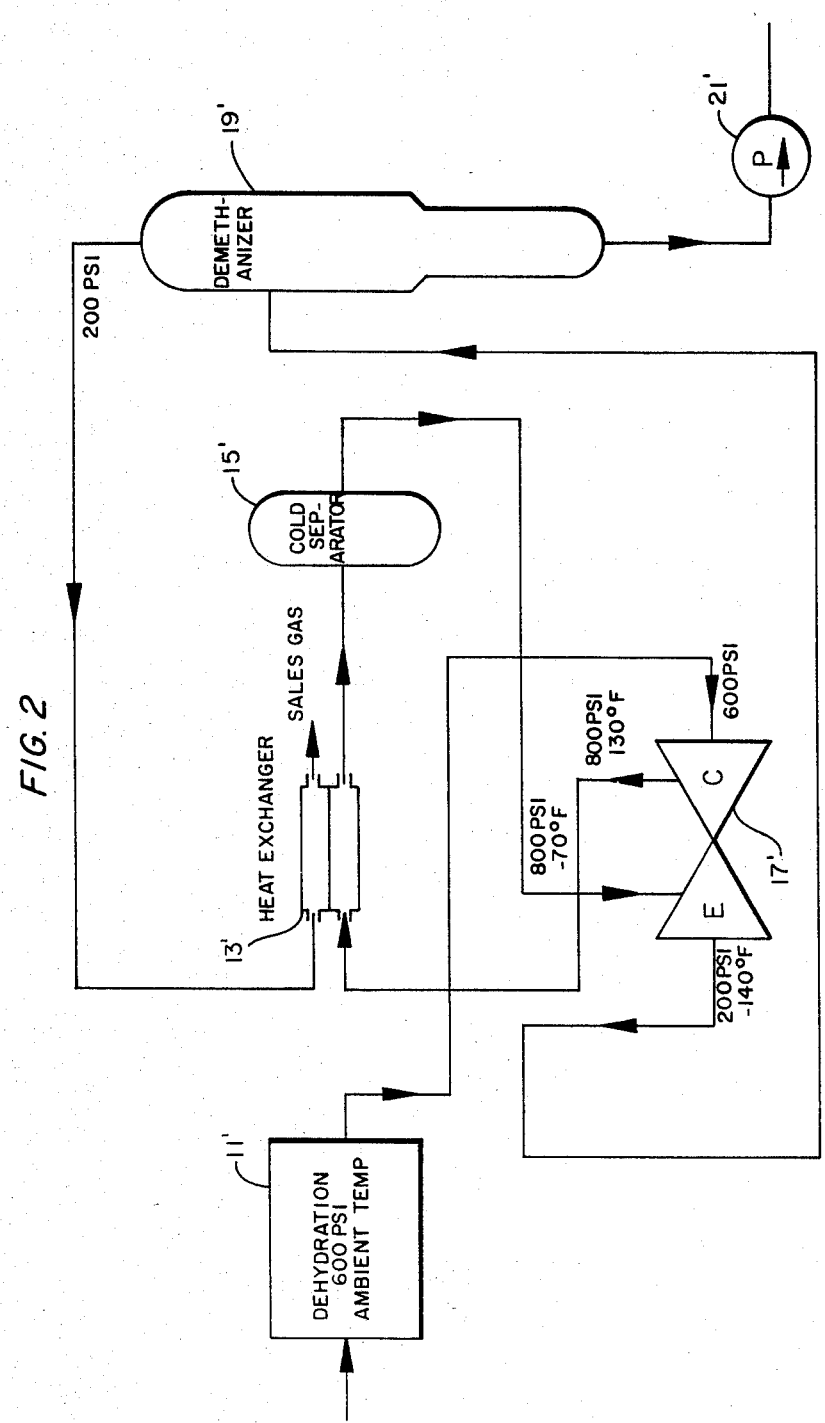
FIG. 2 is a schematic diagram illustrating a turboexpander compressor connected into a prebooster gas processing system.

FIG. 2 discloses the same equipment connected into a prebooster system. The same numerals will be used to describe the equipment, but with a prime symbol to indicate the different manner of processing. In the prebooster schematic, gas enters the dehydration apparatus 11' typically at about 600 psi and at ambient temperature. The gas immediately proceeds to the compressor intake of the turboexpander compressor 17'. The compressor, being driven by the expander turbine, compresses the gas to about 800 psi, with the temperature increasing to about 130° F. The gas proceeds to heat exchanger 13' where it transfers heat to cold gas proceeding through the heat exchanger.

The chilled gas then proceeds to a cold separator 15', then enters the expander intake at 800 psi and typically $-70°$ F. The gas proceeds from the expander of the turboexpander compressor 17' at 200 psi and $-140°$ F. The cold, low pressure gas proceeds to the demethanizer 19' where the heavy hydrocarbons are removed and pumped for sale or further processing by pump 21'. The gas proceeds from the demethanizer 19' at 200 psi and passes through the heat exchanger 13' to absorb heat from the warm gas being pumped from the compressor of the turboexpander compressor 17'. The warm, dry gas from the heat exchanger 13' enters the sales line.

Figure 3:
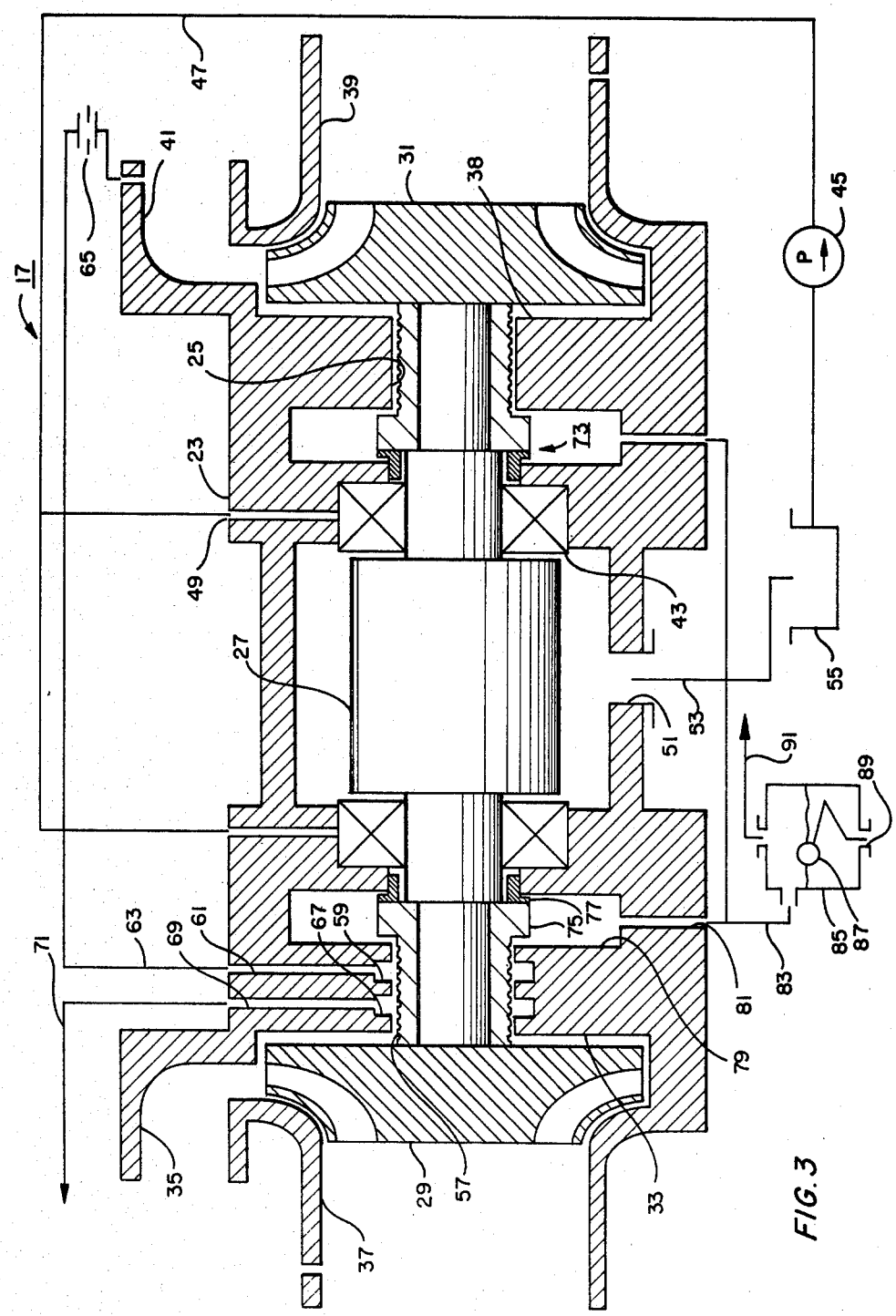
FIG. 3 is a schematic sectional view of a turboexpander compressor constructed in accordance with this invention.

Referring now to FIG. 3, turboexpander compressor 17 includes a housing 23 that has a bore 25 of various dimensions extending through the housing. A shaft 27 is carried in the bore 25, with the ends of shaft 27 protruding beyond the ends of bore 25. An expander turbine 29 is located on one end of shaft 27. Expander turbine 29 is a wheel containing a plurality of vanes (not shown) that are curved to cause rotation when contacted by a stream of high pressure gas. A compressor turbine 31 is rigidly mounted to the other end of shaft 27 and rotates in unison with the expander turbine 29. Compressor turbine 31 is also a wheel containing a plurality of vanes for compressing a stream of gas.

The expander turbine 29 is contained within an expander chamber 33 that has an expander intake 35 for receiving high pressure gas and an expander discharge 37 for discharging gas proceeding from the expander turbine 29. In the post booster system of FIG. 1, the expander intake 35 is connected to the cold separator 15 and the expander discharge 37 to the demethanizer 19. In the prebooster system of FIG. 2., the expander intake 35 is connected to the cold separator 15' and the discharge 37 to the demethanizer 19'. In both systems, the gas proceeding from the expander discharge 37 will be at a very low temperature and relatively low pressure.

The compressor turbine 31 is carried within a compressor chamber 38 that has a compressor intake 39 and a compressor discharge 41. In the post booster system of FIG. 1, the compressor intake 39 is connected to the warm outlet of the heat exchanger 13. The compressor discharge 41 is connected to the sales gas line. In the prebooster system of FIG. 2, the compressor intake 39 is connected to the dehydration apparatus 11'. The compressor discharge 41 is connected to the warm intake of the heat exchanger 13'. In both systems, the gas in the compressor chamber 38 is warm. In the post booster system of FIG. 1, the compressor increases the gas pressure typically from 150 psi to 200 psi. In the prebooster system of FIG. 2, the gas pressure is typically increased from 600 psi to 800 psi.

Shaft 27 is carried in housing 17 on fluid film type bearings 43. Normally there are two sets of bearings 43 spaced-apart from each other. A pump 45 pumps oil through a line 47 and passages 49 into each bearing 43. The oil circulates through the bearings 43, proceeds out a drain 51 and a line 53 back into a reservoir 55. Pump 45 draws from reservoir 55. The oil pressure is typically 100 to 500 psi and the flow rate is fairly high, such as about 8 gallons per minute through both bearings 43.

Chamber seal means for sealing shaft 27 in housing 17 includes labyrinth seals 57 located at each end of housing 23. Labyrinth seals 57 are of a conventional type comprising closely spaced annular grooves. The grooves are spaced closely to a cylindrical surface, which in the drawing is shown to be bore 25. The labyrinth seal grooves 57 are rotated in unison with shaft 27 and provide sealing although at a fairly high leakage rate.

To provide a barrier between the cold gas in expander chamber 33 and the oil in the bearings 43, an injection means including an annular groove 59 is placed in bore 25 in the labyrinth seal 57 on the expander turbine 29 side. Groove 59 is connected by means of a passage 61 and a line 63 to an orifice 65 which causes a pressure drop. Orifice 65 is connected to the compressor discharge 41 to provide warm gas to the annular groove 59 at a pressure lower than the compressor discharge 41 pressure. Buffer gas from groove 59 is vented through a groove 67 located in labyrinth seal 57 on the expander turbine 29 side of groove 59. The orifice 65 will be sized to provide a pressure in groove 59 that is about the same as the pressure in annular groove 67. The pressure in groove 59 can be lower than the oil pressure in bearings 43. Groove 67 is connected by a passage 69 to a line 71.

The vent line 71 can be connected to the expander discharge 37. The vent line 71 could also be connected to warm low pressure residue, which is the compressor intake 39 in the case of a post booster system such as shown in FIG. 1.

Note that in the case of a post booster system such as shown in FIG. 1, the buffer gas from line 63 will be dry, while in the case of a prebooster system such as shown in FIG. 2, the gas will be process gas, containing all of its heavy hydrocarbons. In both cases, the gas in the groove 59 is used as a thermal barrier only, and not for sealing. There will be no need for any similar grooves on the side of the compressor turbine 31.

The seal system includes in addition to the labyrinth seals 57 two mechanical seals 73. Each mechanical seal 73 is mounted between the bearings 43 and the labyrinth seals 57. Each mechanical seal 73 includes a rotating ring 75 that rotates in unison with shaft 27. A nonrotating ring 77 is mounted to the bore 25 of housing 23. The rings 75 and 77 have opposed faces that are parallel to each other and engage to provide sealing. The rings 75 and 77 are biased toward each other, but at operating speeds, a fluid film separates the faces of the rings 75 and 77.

The faces of the mechanical seals 73 are each carried within a drainage chamber 79, that also is in communication with the inward side of each labyrinth seal 57. A passage 81 leads from each drainage chamber to a line 83, which is connected to a collection chamber 85 maintained at a pressure above ambient. Oil drained into the drainage chamber 79 and gas that leaks through the seals 57 proceed out passage 81 and line 83 to the collection chamber 85.

Collection chamber 85 has a float valve 87 with an outlet 89 in the bottom for discharging oil should the level reach a selected maximum. A line 91 in the top of chamber 85 allows gas to be bled-off for reuse. Line 91 may be connected to a low pressure residue, which in the post booster system of FIG. 1 is the compressor intake 39. Oil drained from collection chamber 85 may be discarded, or it may be decanted of any absorbed gas and placed again in reservoir 55. The pressure in drainage chamber 79 will normally be a low pressure residue pressure, much lower than the pressure in bearings 43. Any buffer gas in groove 59 that leaks through part of labyrinth seal 57 to drainage chamber 79 will undergo a pressure drop as it leaks past grooves in labyrinth seal 57.

In operation, high pressure gas at a temperature of about −70° F. will be pumped through expander intake 35. This gas will spin the expander turbine 29, rotating shaft 27 and driving compressor turbine 31. The gas will discharge from expander discharge 37 at about 150 psi and −140° F. Gas will be drawn in through compressor suction or intake 39. The compressor turbine 31 will compress the gas to a higher pressure, where it will exit compressor discharge 41. In the post booster system of FIG. 1, the gas will be dry and exiting at about 200 psi. In the prebooster system of FIG. 2, the gas in the compressor side will be rich gas exiting at about 800 psi and 130° F.

Oil will be pumped by pump 45 through line 47 and passage 49 through the bearings 43. The oil circulates back into reservoir 55. The labyrinth seals 57 provide sealing to prevent excessive gas flow between chamber 79 and the expander chamber 33 and the compressor chamber 38. Mechanical seals 73 prevent communication of gas leaked past the labyrinth seals 57 with the oil in the bearings 43. Buffer gas will be provided through buffer groove 59 and out groove 67 to provide a thermal barrier and prevent cold gas from leaking into contact with the mechanical seal 73 on the expander side.

Drainage means including drainage chamber 79 and collection chamber 85 will serve to remove any oil leaked past mechanical seals 73 and any gas leaked inward past labyrinth seals 57. The oil and gas will proceed to the collection chamber 85. The gas will be removed to a low pressure residue, while the oil may be discarded or decanted and reused in reservoir 55.

Should the system be shut down, the faces of the rings 75 and 77 of the mechanical seal 73 will positively contact each other and prevent leakage of oil out of the bearings 43 or gas into the bearings 43. The mechanical seals 73 allow the use of process gas as a thermal barrier. The gas provided to the buffer groove 59 can be process gas. In the case of the prebooster system, the fact that the buffer gas is rich in hydrocarbons will not be detrimental because it will not be in contact with any oil being pumped through the bearings 43. In the case of the post booster system, the relatively low pressure of the gas at the compressor discharge is of no concern since the buffer gas is not required to provide sealing against lubricant being pumped at a relatively high pressure.

Referring to FIG. 4, the preferred mechanical seal 73 is shown. The rotating ring 75 is shown integrally formed with shaft 27, although it could be mounted in various manners. Rotating ring 75 has a face 93 that is flat, smooth and circular. Face 93 faces inward toward bearings 43 (FIG. 3). Nonrotating ring 77 has a face 95 that faces outward, away from bearings 43 (FIG. 3). Face 95 is also flat, smooth and circular. Faces 93 and 95 are located within drainage chamber 79 (FIG. 3).

Nonrotating ring 77 has a tubular or cylindrical portion 97 with a cylindrical exterior closely and slidingly received in the bore 25 of housing 23. An annular groove or recess 99 is formed in the exterior of cylindrical portion 97. Recess 99 is a shallow channel that is arcuate in transverse cross-section. The cross-sectional radius and width of recess 99 is much greater than the depth of recess 99. The forward or outward portion of recess 99 may be considered to be an outward wall 99a that is located on the side of recess 99 closer to face 95. Outward wall 99a is arcuate and slopes with respect to the axis of shaft 27. Outward wall 99a terminates at the center of recess 99, which is also the point of maximum depth of recess 99.

A groove 101 is formed in bore 25 and combines with recess 99 to define a cavity. Groove 101 is a rectangular groove in transverse cross-section and dimensioned conventionally both in depth and width for receiving an elastomeric O-ring 103. O-ring 103 is a conventional O-ring having a circular transverse cross-section. O-ring 103 protrudes from groove 101 a selected amount and contacts the recess 99, including the outward wall 99a. The width of the recess 99 is greater than the width of the groove 101 and greater than the cross-sectional diameter of O-ring 103. The cross-sectional radius of recess 99 is much greater than the cross-sectional radius of O-ring 103, also. The inner diameter 105 of the nonrotating ring 77 is considerably greater than the outer diameter of shaft 27, providing a large clearance for oil from the bearings 43.

Recess 99 is axially offset with respect to groove 101 so as to use the O-ring 103 to provide an outward force or bias to the nonrotating ring 77. Recess 99 is positioned so that in a neutral position, with rotating ring 75 removed, nonrotating ring 77 would be located outwardly of its operation position, as shown by the dotted lines 107. In this neutral position, dotted lines 107 show that the bottom or center of the recess 99 would be aligned with the center of the groove 101 and the centerline of the O-ring 103. O-ring 103 would be radially compressed to a selected amount to provide adequate sealing, but it would not be exerting a force either in the outward or inward direction when in this neutral position. O-ring 103 would not be in contact with outward wall 99a.

When assembled, shaft 27 is positioned so as to cause rotating ring 75 to push nonrotating ring 77 inward toward bearings 43 (FIG. 3). As shown by the dotted lines in FIG. 4, this inward movement offsets the center or bottom of groove 99 from the centerline of O-ring 103 and the center of groove 101. The distance from the bottom of recess 99 to nonrotating face 95 is greater than the distance from the center of groove 101 to the nonrotating face 95. This places the outward wall 99a into contact with O-ring 103, causing it to deform as shown in the drawings. The deformation of O-ring 103 causes O-ring 103 to exert a force against nonrotating ring 77 in an outward direction. This force, which is about 5 pounds when not rotating, urges the face 95 into contact with face 93.

During operation, the shaft 27 will be spinning, causing rotating ring 75 to rotate with respect to nonrotating ring 77. Oil will be located in the inner diameter 105 and will also be in communication with the inner side of O-ring 103. O-ring 103 prevents nonrotating ring 77 from rotating and also prevents oil leakage between bore 25 and the exterior of ring 77. The oil will be at a considerably higher pressure than the pressure on the outside of rotating ring 75, possible 400 psi. The oil pressure will exert an outward force on nonrotating ring 77 that is equal to the area $A_2$ times the oil pressure. Area $A_2$ is the area of nonrotating ring 77 between a boundary aligned with the bottom of recess 99 and the inner diameter 105.

The oil pressure will also be exerting a force on nonrotating ring 77 in an inward direction toward bearings 43 that is proportional to a pressure gradient between the outside pressure and the oil pressure. This inward force acts on an area that is equal to the outer diameter less the inner diameter of nonrotating face 77 or the sum of the areas $A_1$ plus $A_2$. Area $A_1$ is the area of face 95 between the face 95 outer diameter and the boundary with area $A_2$. The deformed O-ring 103 also exerts an outward force on nonrotating ring 77 that combines with the outward force due to oil pressure to provide a total outward force. The outward force due to oil pressure acting on O-ring 103 increases with oil pressure. The total outward force is preferably only slightly greater than the inward force during operating conditions. This provides a small resultant outward force to keep the faces 93 and 95 in contact but avoids excessive wear on the faces 93 and 95. The O-ring 103 and the offset recess 99 enables the face 95 to be sized to provide a very close balance between the inward and outward forces. In the preferred embodiment, area $A_1$ equals area $A_2$.

The invention has significant advantages. The use of mechanical seals allows the omission of seal gas such as used in the prior art. The thermal barrier or buffer gas may be process gas, both of low pressure and rich in hydrocarbons, without the danger of diluting the lubricating oil. The mechanical seals allow the system to be shut down without oil and gas communication. The use of the O-ring as bias means for biasing the faces into contact with each other not only saves space, but also allows the forces to be closely balanced to provide a long life. The oil pressure acting on the O-ring and recess provides a variable outward force that depends upon oil pressure, adjusting itself to a wide range of pressure differentials across the seal, unlike standard mechanical spring seals.

While the invention has been shown in only one of its forms, it should be apparent to those skilled in the art that it is not so limited but is susceptible to various changes without departing from the scope of the invention.

I claim:

1. An improved mechanical seal for sealing a rotating shaft extending through a bore, comprising in combination:
   a rotating ring having a rotating face and carried by the shaft for rotation therewith;
   a nonrotating ring having a nonrotating face that sealingly engages the rotating face, and having a cylindrical portion carried within the bore;
   the cylindrical portion having an annular recess that combines with an annular groove formed in the bore to define a cavity; and
   a resilient packing ring carried within the cavity;
   the recess being axially offset from the groove, deforming the packing ring and causing the packing ring to exert a force on the nonrotating ring against the rotating ring.

2. The seal according to claim 1 wherein the groove has a rectangular cross-section and the recess has an arcuate cross-section.

3. The seal according to claim 1 wherein the packing ring is an elastomeric O-ring of circular cross-section, wherein the groove has a rectangular cross-section, and the recess has an arcuate cross-section with a width greater than the depth of the recess.

4. An improved mechanical seal for sealing a rotating shaft extending through a bore, comprising in combination:
   a rotating ring having a rotating face and carried by the shaft for rotation therewith;
   a nonrotating ring having a stationary face that sealingly engages the rotating face, and having a cylindrical portion carried within the bore that has an inner diameter greater than the shaft diameter;
   the cylindrical portion having an annular recess on its exterior with an outward wall;
   the bore having a groove containing an elastomeric packing ring that sealingly engages the recess;
   the outward wall of the recess being located to deform the packing ring inwardly when the stationary face contacts the rotating face, causing the packing ring to exert an outward force on the nonrotating ring.

5. The seal according to claim 4 wherein the outward wall slopes with respect to the axis of the shaft.

6. The seal according to claim 4 wherein the outward wall is arcuate and formed with a radius greater than its depth.

7. The seal according to claim 4 wherein the outward wall is arcuate and the recess has a point of maximum depth that is located inward of the center of the groove when the faces are in contact with each other.

8. An improved mechanical seal for sealing a rotating shaft extending through a bore, comprising in combination:
- a rotating ring having a rotating face carried rigidly by the shaft;
- a nonrotating ring having a circular nonrotating face that sealingly engages the rotating face, and having a cylindrical portion slidingly carried within the bore that has an inner diameter greater than the shaft diameter;
- the bore having a groove of rectangular cross-section that contains an elastomeric O-ring of circular cross-section;
- the cylindrical portion having an annular recess on its exterior with an arcuate outward wall having a point of maximum depth, the radius of the outward wall being greater than the depth of the recess;
- the distance from the point of maximum depth of the recess to the nonrotating face being greater than the distance from the center of the groove to the nonrotating face, causing the O-ring to exert an outward force against the outward wall.

9. The seal according to claim 8 wherein the area of the nonrotating face from the periphery extending to a boundary aligned with the point of maximum depth of the recess is substantially equal to the area of the nonrotating face from the boundary to the inner diameter.

* * * * *